United States Patent [19]

Musa

[11] Patent Number: 5,287,283

[45] Date of Patent: Feb. 15, 1994

[54] FAILURE DIAGNOSIS DEVICE FOR AN ENGINE WHICH COMPARES AIRFUEL RATIO AND EXHAUST PRESSURE WITH A PREDETERMINED VALUE

[75] Inventor: Ikuo Musa, Himeji, Japan

[73] Assignee: Mitsubishi Denki Kabushiki Kaisha, Tokyo, Japan

[21] Appl. No.: 679,977

[22] Filed: Apr. 3, 1991

[30] Foreign Application Priority Data

Apr. 4, 1990 [JP] Japan .................. 2-91289

[51] Int. Cl.$^5$ ............................................. F02D 41/22
[52] U.S. Cl. ........................... 364/431.11; 364/431.04; 123/690
[58] Field of Search ............... 364/424.03, 431.01, 364/431.03–431.06, 431.11; 123/673, 676, 684, 687, 688, 690; 73/117.3

[56] References Cited

U.S. PATENT DOCUMENTS

| | | | |
|---|---|---|---|
| 4,149,408 | 6/1979 | Ezoe et al. | 73/118.1 |
| 4,189,940 | 2/1980 | Hulls et al. | 73/117.3 |
| 4,269,156 | 5/1981 | Drellishak | 123/676 X |
| 4,424,709 | 1/1984 | Meir, Jr. et al. | 73/117.3 |
| 4,509,485 | 9/1985 | Hasegawa | 123/676 |
| 4,617,900 | 10/1986 | Kobayashi et al. | 123/684 |
| 4,934,328 | 6/1990 | Ishii et al. | 123/673 |
| 4,936,278 | 6/1990 | Umeda | 123/684 X |
| 4,962,741 | 10/1990 | Cook et al. | 123/673 |
| 4,982,714 | 1/1991 | Takahashi et al. | 123/684 X |

FOREIGN PATENT DOCUMENTS 3729770 9/1987 Fed. Rep. of Germany .

OTHER PUBLICATIONS

Gore, Douglas, A., et al, Society of Automotive Engineers, Inc., "Noncontact Techniques for Diesel Engine Diagnostics Using Exhaust Waveform Analysis", Dec. 1988, Paper No. 870399.

*Primary Examiner*—Vincent N. Trans
*Attorney, Agent, or Firm*—Sughrue, Mion, Zinn, Macpeak and Seas

[57] ABSTRACT

A failure diagnosis device for determining engine abnormalities by comparing the air-fuel ratio or the exhaust pressure of an engine with a predetermined value or by determining that the air fuel ratio or the exhaust pressure of the engine is different from the average air-fuel ratio or the average exhaust pressure by a predetermined amount. This comparison is made only when the engine is in a predetermined running condition in which either the air-fuel ratio or the exhaust pressure is stabilized for a predetermined period of time. When the air-fuel ratio or exhaust pressure is different from the average air-fuel ratio or from the average exhaust pressure by a predetermined value, engine abnormality can be detected for each cylinder or for each cylinder group.

3 Claims, 18 Drawing Sheets

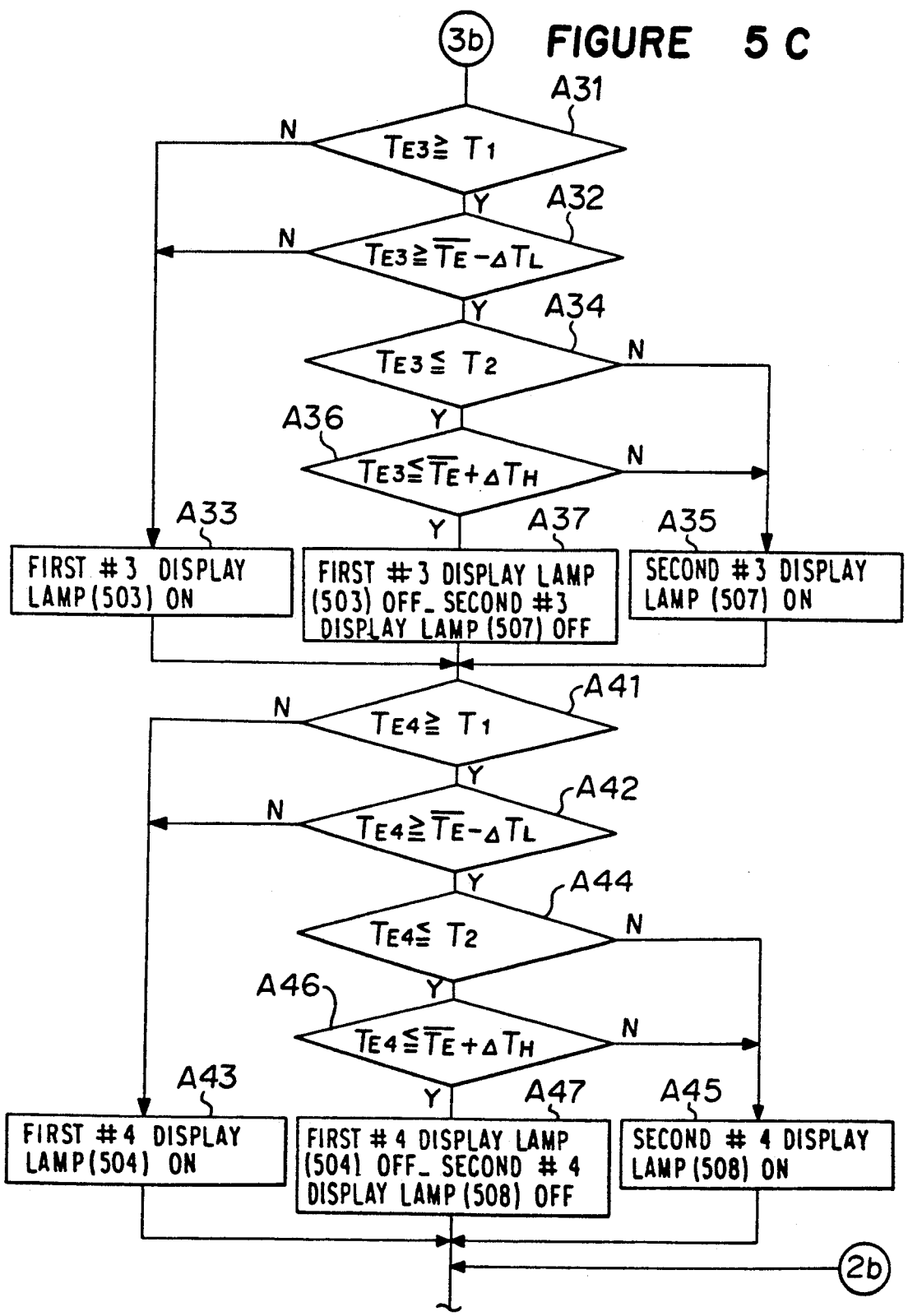

FAILURE DIAGNOSIS DEVICE FOR AN ENGINE WHICH COMPARES AIRFUEL RATIO AND EXHAUST PRESSURE WITH A PREDETERMINED VALUE

BACKGROUND OF THE INVENTION

1. Field of the Invention

The present invention relates to a failure diagnosis device for an engine capable of determining an abnormality of the engine such as a failure in an ignition system, a failure in a fuel system and so on.

2. Discussion of Background

The conventional failure diagnosis device for an engine determines the abnormality of the engine from the result of a comparison between a signal corresponding with a catalyst temperature output from a temperature sensor of the catalyst which is installed in an exhaust passage of the engine and purifies the exhaust gas of the engine, and a set value corresponding with a predetermined temperature.

For instance, when the engine misfires, unburnt fuel flows to the catalyst which causes a chemical reaction such as oxidation or deoxidation. As the result, a reaction heat is generated at the catalyst and the catalyst temperature is increased compared with that in the normal run of the engine. The catalyst temperature on this occasion is detected by the above temperature sensor and a failure of the engine is determined by the method as mentioned above. When the abnormality of the engine is determined, the failure diagnosis device for the engine enlightens a display lamp and informs the abnormality to a driver.

Since the conventional failure diagnosis device for an engine is composed as above, for instance, in the high load region of the engine, the air-fuel ratio of the engine is enriched, and unburnt fuel is contained in the exhaust gas as discharged to the air. The unburnt fuel touches the catalyst which causes a chemical reaction and elevates catalyst temperature. As the result, this type of failure is difficult to be differentiated from a failure in an ignition system. Therefore the accuracy of the failure diagnosis is deteriorated.

When the reference temperature is set to a high value to enhance the accuracy of the failure diagnosis, and the above temperature sensor detects a catalyst temperature which is higher than the predetermined reference temperature, the catalyst has already reacted with the unburnt fuel enough to be deteriorated by the heat, and cannot be used.

Furthermore in the conventional method, the detection of the catalyst temperature is not specific to each cylinder or to each group of cylinders. Therefore it is impossible to judge the abnormality of the engine with respect to each cylinder or each group of cylinders.

SUMMARY OF THE INVENTION

It is an object of the present invention to provide a failure diagnosis device for an engine capable of, in a predetermined running range of the engine, detecting an air-fuel ratio or an exhaust pressure of the engine, judging an abnormality of the engine therefrom, and determining a failure of the engine rapidly and with high accuracy.

According to an aspect of the present invention, there is provided a failure diagnosis device for an engine which comprises means for detecting an air-fuel ratio of the engine installed at an exhaust pipe so that the air-fuel ratio of the engine is detected, means for detecting various informations used to detect a running condition of the engine, means for determining a domain for abnormality detection which determines whether the running condition of the engine falls in a predetermined running condition domain which is defined by various characteristics of the engine and in which the air-fuel ratio of the engine is stabilized, and means for determining an abnormality in a combustion stage of the engine having the running condition of the engine which falls in the first predetermined running condition domain by a predetermined comparison between the air-fuel ratio detected by the means for detecting an air-fuel ratio of the engine and a predetermined value.

Detection of the abnormality may be performed for a cylinder or for a cylinder group by comparing an air-fuel ratio of the cylinder or of the cylinder group with a mean value of the air-fuel ratio of all the cylinders.

The air-fuel ratio may be substituted by exhaust pressure of engine.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 5A, 5B, and 5C are flow charts showing the operation of the control device according to a second embodiment;

DETAILED DESCRIPTION OF PREFERRED EMBODIMENT

Figure 1:
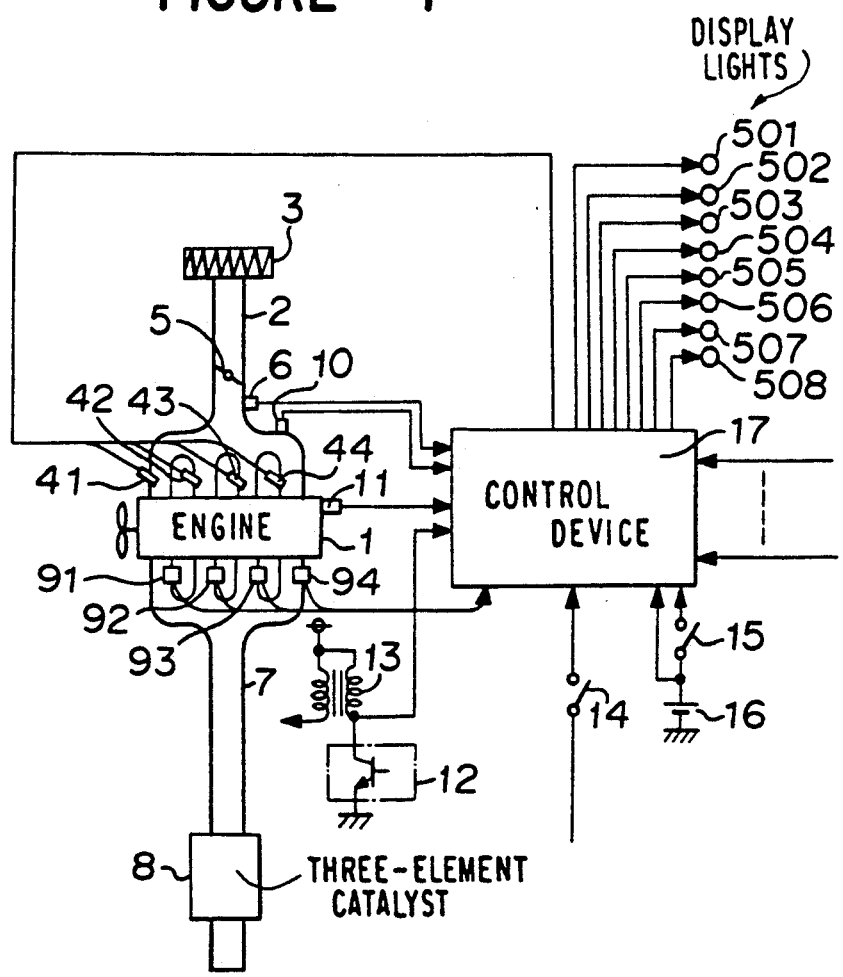
FIG. 1 is a schematic diagram showing a first embodiment of an engine unit according to the present invention.

An embodiment of the present invention will be explained referring to the drawings.

FIG. 1 shows the structure of an engine in the first embodiment of the present invention. In FIG. 1, the engine 1 which is, for instance, a four cylinders spark ignition type engine mounted on a vehicle, sucks air which passes through the air cleaner 3 installed at the inlet of the intake manifold 2, the quantity of which corresponds to the opening degree of the throttle valve 5 which opens and closes by being coupled with an acceleration pedal.

The intake manifold pressure in the intake manifold 2 which is situated on the downstream side of the throttle valve 5, is detected by the pressure sensor 6 in absolute pressure. The temperature of the intake air is detected by the intake air temperature sensor 10. The cooling water temperature of the engine 1 is detected by the cooling water temperature sensor 11.

Fuel is supplied to the engine by injection, becomes an air-fuel mixture, and is sucked to the engine, by the injectors 41 to 44 installed at the first cylinder (#1) to the fourth cylinder (#4) of the engine 1 respectively, each injector being separately controlled by the control device 17, mentioned later. Hereinafter, No. G cylinder (G is an integer, for instance, 1 to 4) is denoted as #G.

On the other hand, the igniter 12 which receives an ignition signal from a signal generator unit, stops a current in a primary coil of the ignition coil 13 and generates a high voltage at a secondary coil of the ignition coil 13. The high voltage is supplied to an ignition plug (not shown) installed at each cylinder of the engine 1, and ignites it, by which the explosion stroke of cylinder is carried out.

Exhaust gas from the engine 1 is purified by passing through the three-element-catalyst 8 installed at a common exhaust passage of the exhaust manifold 7, and exhausted to the air guided by the exhaust manifold 7. At an exhaust pipe of the exhaust manifold 7, situated on the upstream side of the three-element-catalyst 8, #1 to #4 linear oxygen sensors 91 to 94 are installed at each cylinder of the engine 1, detect the concentration of oxygen contained in exhaust gas of each cylinder, and output analogue detect signals, the size of which corresponds with the oxygen concentration or an air-fuel ratio.

A numeral 14 signifies a cranking switch, 16, a battery, 15, a key switch, 17, a control device, 501 to 504, the first #1 to the first #4 display lamps, and 505 to 508, the second #1 to the second #4 display lamps.

Figure 2:
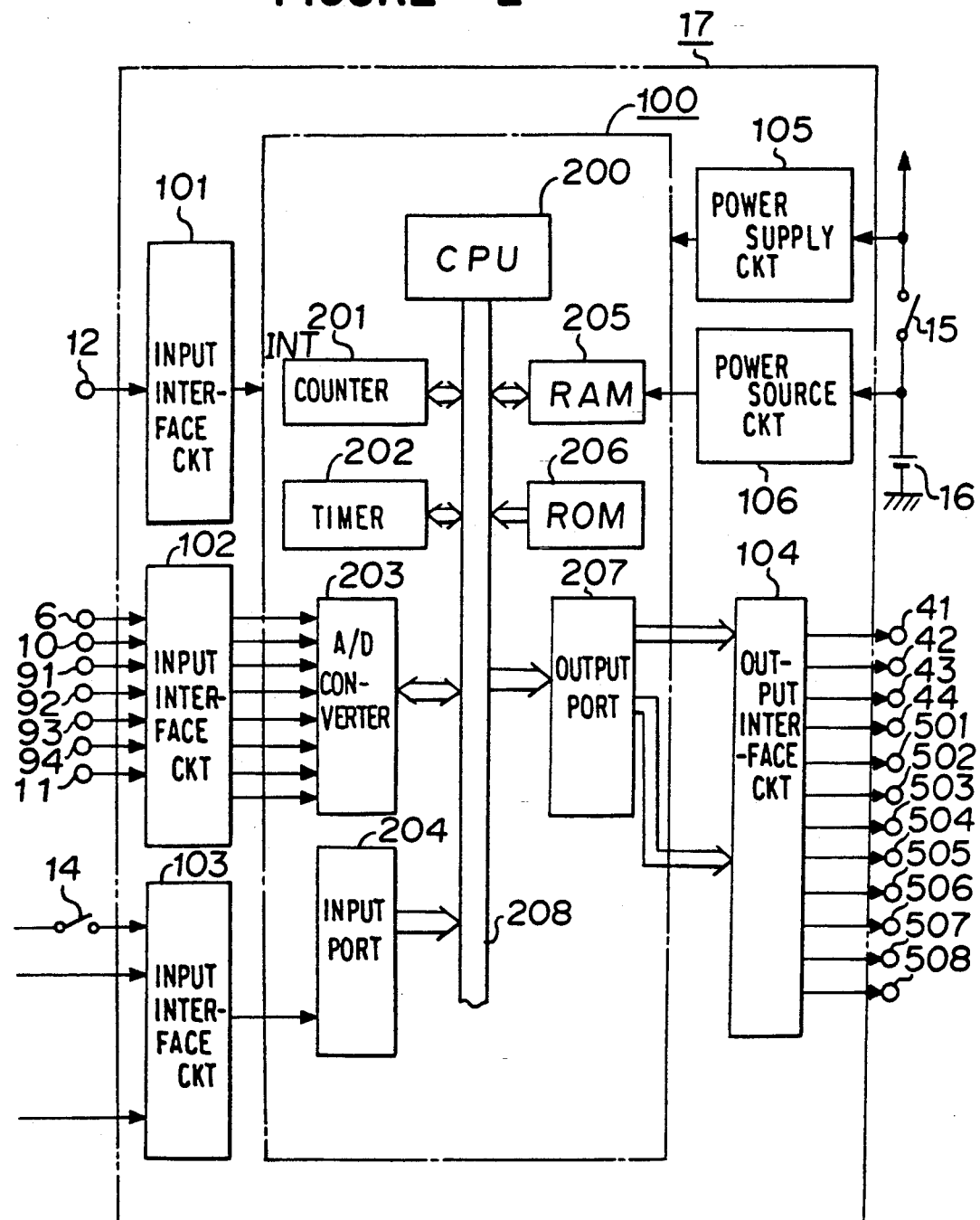
FIG. 2 is a diagram showing an inner structure of a control device or the like according to the first embodiment.

FIG. 2 is a block diagram showing a detailed inner structure of the control device 17, shown in FIG. 1. The control device 17 is started up after being supplied a constant voltage from the battery 16 through the first power supply circuit 105 by making the key switch 15 ON. With the starting up, the engine 1 receives temporarily a driving force of a starter (not shown) supplied with fuel, and is started. With the starting up of the starter the cranking switch 14 is made ON. The ON signal is inputted to the control device through the third input interface circuit 103 and the input port 204. Power is supplied from the battery 16 through the second power source circuit 106 to the RAM 205 which is involatile, irrespective of ON and OFF of the key switch 15.

Figure 3A:
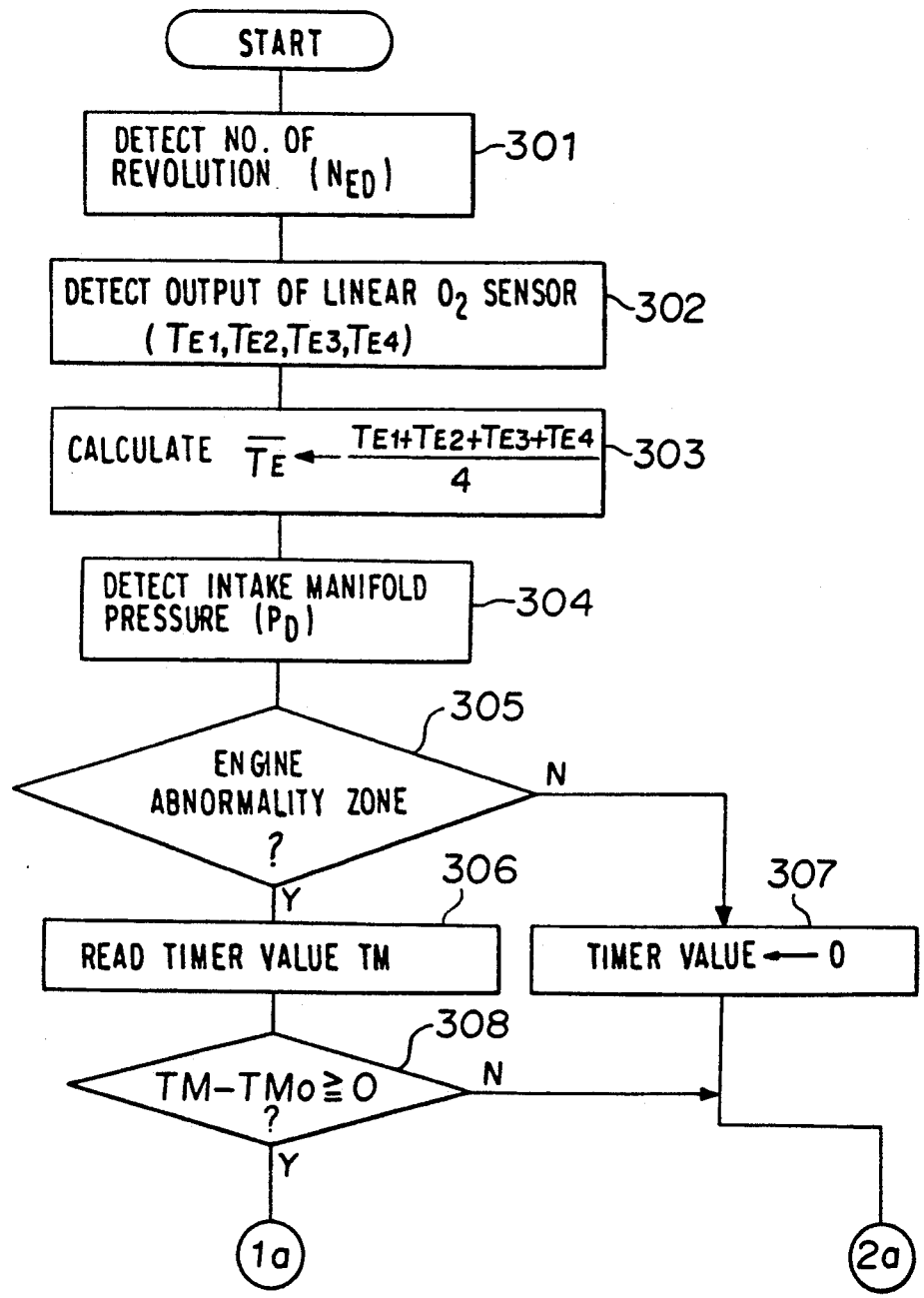
FIGS. 3A, 3B, and 3C are flow charts showing the operation of the control device according to the first embodiment.
Figure 3B:
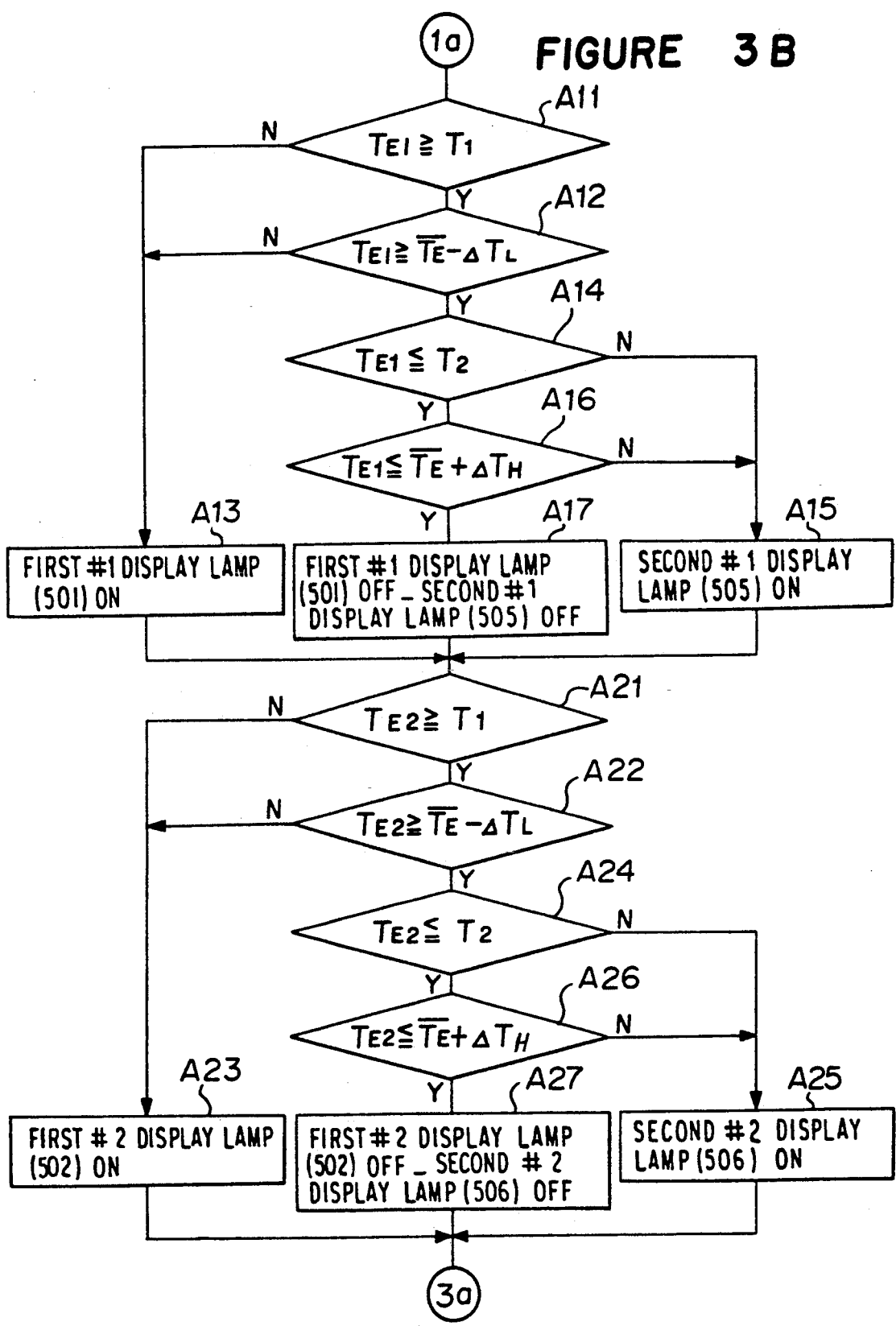
Figure 3C:
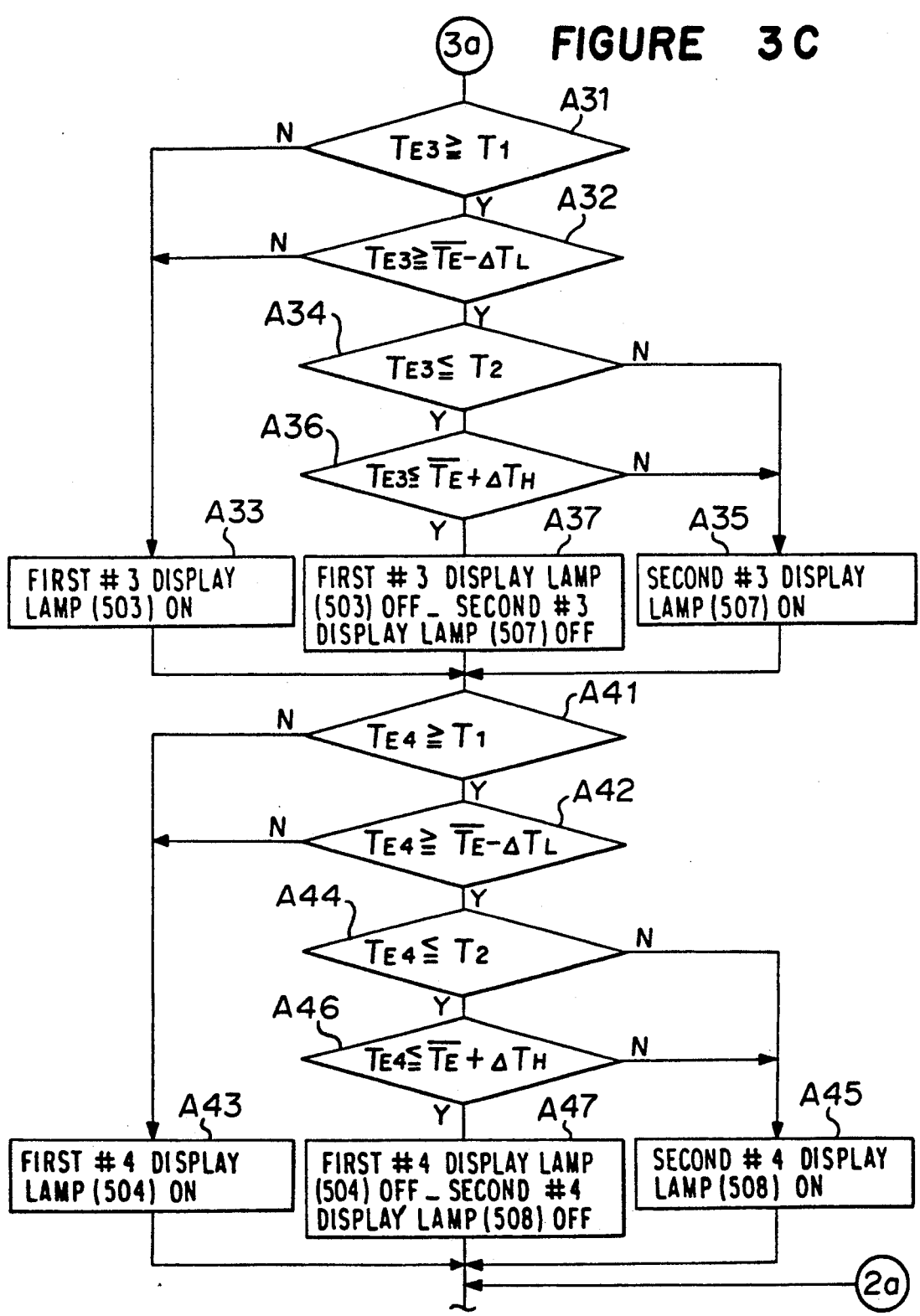

The CPU 200 is operated according to the control program in a flow chart shown in FIGS. 3A, 3B, and 3C which is stored in the ROM 206 and so on. The microcomputer 100 in the control device 17 receives a change of an ignition pulse signal as an interrupt input signal, from the igniter 12 through the first input interface circuit 101. The generated period of the interrupted input signal is measured by the counter 201, and converted to the revolution number data $N_{EW}$ which represents the revolution number of the engine $N_E$, by the CPU 200.

The control device receives each analogue detect signal of the pressure sensor 6, the intake air temperature sensor 10, the cooling water temperature sensor 11, and #1 to #4 linear oxygen concentration sensors 91 to 94, converts the analogue signals by an analogue to digital conversion through the second input interface circuit 102 and the A/D converter 203, and successively reads them as digital signals of the intake manifold pressure value $P_D$, the intake air temperature value $T_A$, the cooling water temperature value $T_W$, and #1 to #4 air-fuel ratio values $T_{E1}$ to $T_{E4}$. These values $P_D$,, $T_A$, $T_W$, and $T_{E1}$ to $T_{E4}$ increase in proportion to the increase of for instance, the detected pressure, the detected temperature, and the detected oxygen concentration.

The control device 17, based on the revolution number data $N_{ED}$ and the intake manifold pressure value $P_D$, calculates a basic fuel quantity by a known method, obtains driving times of #1 to #4 injectors, 41 to 44 by correcting them based on the intake air temperature value $T_A$ or by the cooling water temperature value $T_W$, and using the timer 202, controls the driving time of each injector of #1 to #4 injectors 41 to 44 through the output port 207 and the output interface circuit 104.

The control device 17 carries out the control program shown in FIG. 3, and identifies the existence of an abnormality of the engine 1 for each cylinder. When the abnormality takes place, the control device 17 enlightens a display lamp, which corresponds with the abnormal cylinder and the kind of the abnormality, of the first #1 to the first #4 display lamps 501 to 504, and the second #1 to the second #4 display lamps 505 to 508, through the output port 207 and the output interface circuit 104.

The control device 17 consists of the microcomputer 100, composed of the elements 101 to 106, the elements 200 to 207, and a bus 208 which connects the above elements.

As mentioned above, with the start up, the control device 17 carries out a flow chart of a main routine, not shown, and calculates the fuel injection quantity. The control device 17 interrupts the carrying out of the flow chart in the main routine, for instance, by each interrupt input signal from the igniter 12, and carries out the interruption treatment routine shown in FIGS. 3A to 3C.

Figure 4:
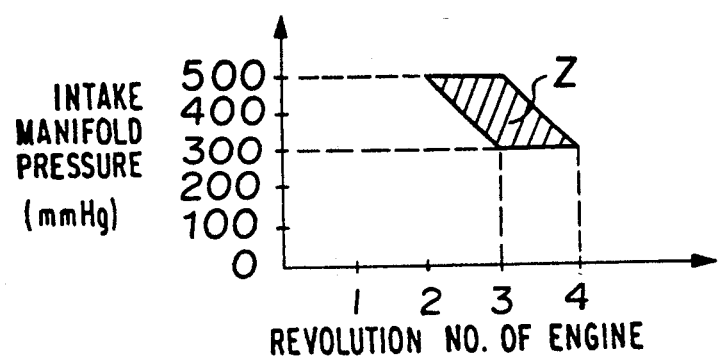
FIG. 4 is an explanatory diagram showing an abnormality criteria zone of an engine according to the first embodiment.

First of all, in Step 301, a period of change of signal of the igniter 12 is measured by the counter 201, and based on the period, the revolution number data $N_{ED}$ which represents the revolution number of the engine 1 $N_E$ is calculated. In Step 302, the control device 17 successively reads #1 to #4 air-fuel ratio values $T_{E1}$ to $T_{E4}$ which are obtained based on the output Of #1 to #4 linear oxygen sensors 91 to 94, respectively, which is a detected value of the oxygen concentration contained in the exhaust gas of each cylinder of the engine 1. In Step 303, the control device 17 carries out a calculation of $\overline{T}_E = (T_{E1} + T_{E2} + T_{E3} + T_{E4})/4$ and obtains the mean air-fuel ratio value $\overline{T}_E$. In Step 304, the control device 17 reads the intake manifold pressure value $P_D$ which represents the intake manifold pressure P from the output of the pressure sensor 6. In Step 305, the control device 17 judges on whether the running condition of the engine falls in an engine abnormality criteria zone Z shown in the hatched part of FIG. 4, based on the revolution number data $N_{ED}$ and the intake manifold pressure value $P_D$. This engine abnormality criteria zone is a predetermined running domain, wherein the air-fuel ratio is stabilized, and is stored in the ROM 206 being converted to a data table. In the above Step 305, the control device 17, utilizing this data table, judges on whether the running condition is in the zone Z. When the running condition falls in the engine abnormality criteria zone Z, the operation goes to Step 306, and the control device 17 reads the timer value TM. When the running condition falls out of the zone Z, the operation goes to Step 307, and the timer value TM is reset to 0. The timer of the timer value TM, is for instance a soft timer, which counts up at each predetermined time, or at each predetermined step, by the interruption treatment routine or by the main routine. In Step 308, the control device 17 judges on whether the timer value TM is more than a predetermined value $TM_0$, or whether time elapses more than a predetermined time in the engine abnormality criteria zone Z. That is to say, the control device 17 judges on whether time required for stabilizing the air-fuel ratio in the zone Z elapses. When $TM \geq TM_0$, and more than the predetermined time elapsed, the operation goes to the next step A11.

Next, the control device 17 carries out Steps AG1 to AG7, in the order of G of 1, 2, 3, and 4. In Step AG1, the control device 17 judges on whether #G air-fuel ratio value $T_{EG}$ obtained from the sensor 10G in Step 302 is equal to or more than the first predetermined value $T_1$. When $T_{EG}$ is equal to or more than $T_1$, the operation goes to AG2. If $T_{EG}$ is below $T_1$, the air-fuel ratio value of G cylinder is abnormally low, and over-rich, and the operation goes to Step AG3. The first predetermined value $T_1$ is set to the value between that at over-rich time and that at normal time. The value is set when the running condition is in the engine abnormality criteria zone and a predetermined time elapsed. (Hereinafter, this condition is introduced in determining the set value. However, the explanation is omitted.) In Step AG2, the control device 17 judges whether #G air fuel ratio value $T_{EG}$ is equal to or more than the average criteria value $\overline{T}_E - \Delta T_L$ which is a difference between the mean air-fuel ratio value $\overline{T}_E$ obtained in Step 303 and a positive predetermined value $\Delta T_L$. When $T_{EG}$ is equal to or more than $\overline{T}_E - \Delta T_L$, the operation goes to Step AG4. When $T_{EG}$ is below $\overline{T}_E - \Delta T_L$, the operation goes to Step AG3. In this case, for instance, even when Only one cylinder is over-rich, the mean air-fuel ratio value $\overline{T}_E$ is near to the value of the air-fuel ratio in normal time. Accordingly, the discrimination between the value in normal time and that in over-rich time is made based on the average air-fuel ratio value subtracted by $\Delta T_L$.

In Step AG3, the control device 17 enlightens the first #G display lamp 50G, when the air-fuel ratio of G cylinder is abnormally low due to the over-rich state.

In Step AG4, the control device 17 judges on whether #G air-fuel ratio value $T_{EG}$ is below the second predetermined value $T_2$. The second predetermined value $T_2$ is set to a value between that in normal time and that in over-lean time. When $T_{EG}$ is below $T_2$, the operation goes to Step AG6. When $T_{EG}$ exceeds $T_2$, the air-fuel ratio value of G cylinder is abnormally large and over-lean, the operation goes to Step AG5. In Step AG6, the control device 17 judges whether #G air-fuel ratio value $T_{EG}$ is below the second average criteria value $\overline{T}_E + \Delta T_H$. In this case, the mean air-fuel value $\overline{T}_E$ is, even if one cylinder is over-lean, near to a value Of the air-fuel ratio value in normal time. Therefore, the discrimination of the value between that in normal time and that in over-lean time is judged based on the mean air-fuel ratio added by a predetermined value $\Delta T_H$. In Step AG6, when $T_{EG}$ is below $\overline{T}_E + \Delta T_H$, the operation goes to Step AG7. When $T_{EG}$ is equal to or more than $\overline{T}_E + \Delta T_H$, the operation goes to Step AG5. In Step AG5, the control device 17 enlightens the second #G display lamp 50 (G+4), since the air-fuel ratio value of G cylinder is abnormally large due to the over-lean state. In Step AG7, the control device 17 put off both the first #G display lamp 50G and the second #G display lamp 50 (G+4) since #G cylinder is in normal state. After a judgment is made as $TM < TM_0$ in Step 307, or in Step 308, then after Step A43, or Step A45, or Step A47, the operation goes to a next program.

Moreover, in the first embodiment, the next relationship is to be established:

$$T_1 < \frac{T_1 + T_2}{2} - \Delta T_L < \frac{T_1 + T_2}{2} + \Delta T_H < T_H$$

The fuel supply is stopped to the cylinder of the engine for which the display lamp is enlightened, while the engine continues running.

In the above first embodiment, when the first #G lamp is enlightened, in a group of the first #1 to the first #4 display lamp 501 to 504, it signifies that the G cylinder is over-rich, or the oxygen in the exhaust gas is insufficient, and the air-fuel mixture is abnormally enriched. This means that an abnormality takes place in the fuel system, and excessive fuel is supplied to the engine 1.

When the second #G display lamp is enlightened, in a group of the second #1 to the second #4 display lamps 505 to 508, the G cylinder is over-lean, or the oxygen in the exhaust gas is excessive. This means that the unburnt air fuel mixture is exhausted from the cylinder, or a misfire wherein fuel is not supplied.

Figure 5A:
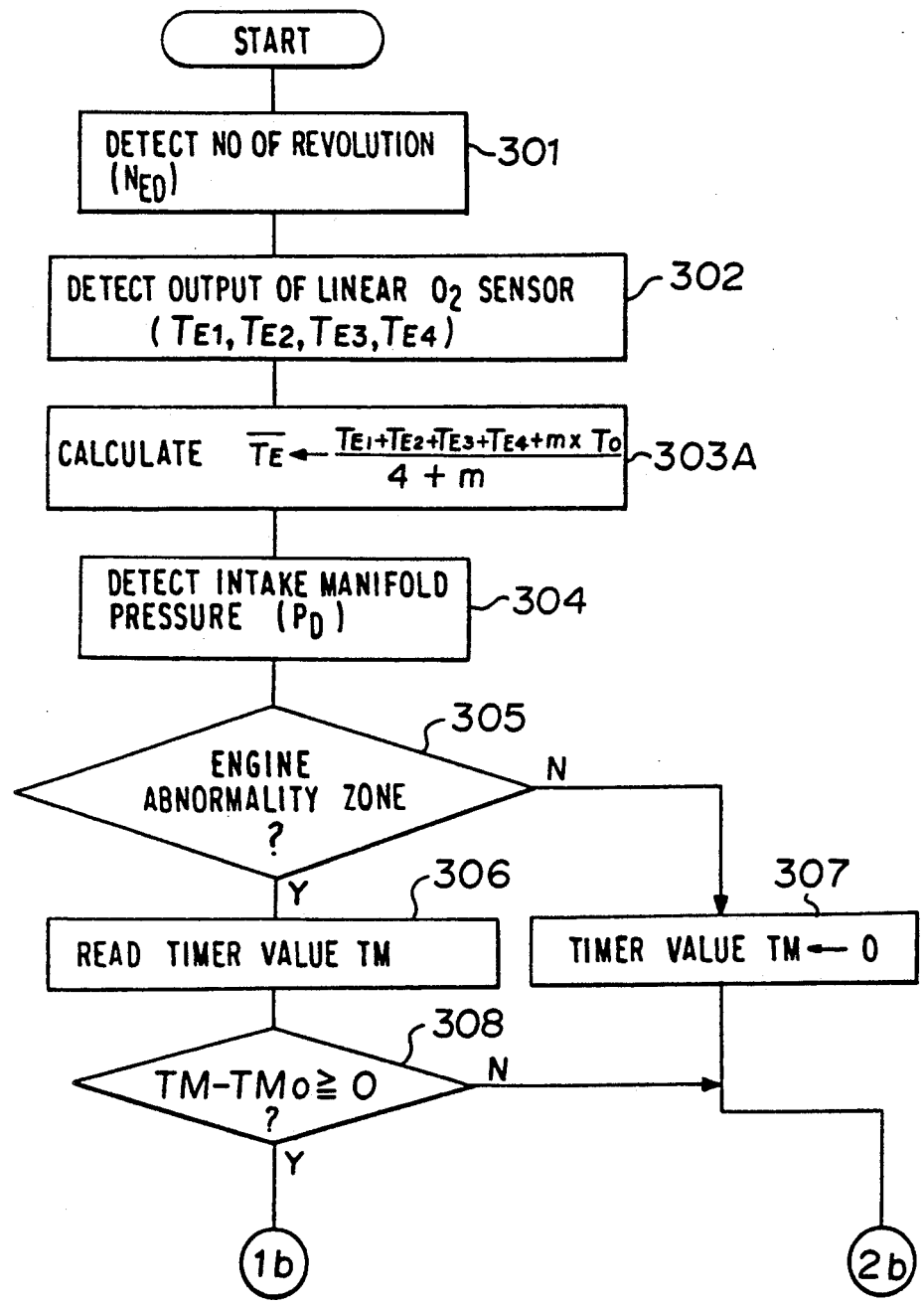
Figure 5B:
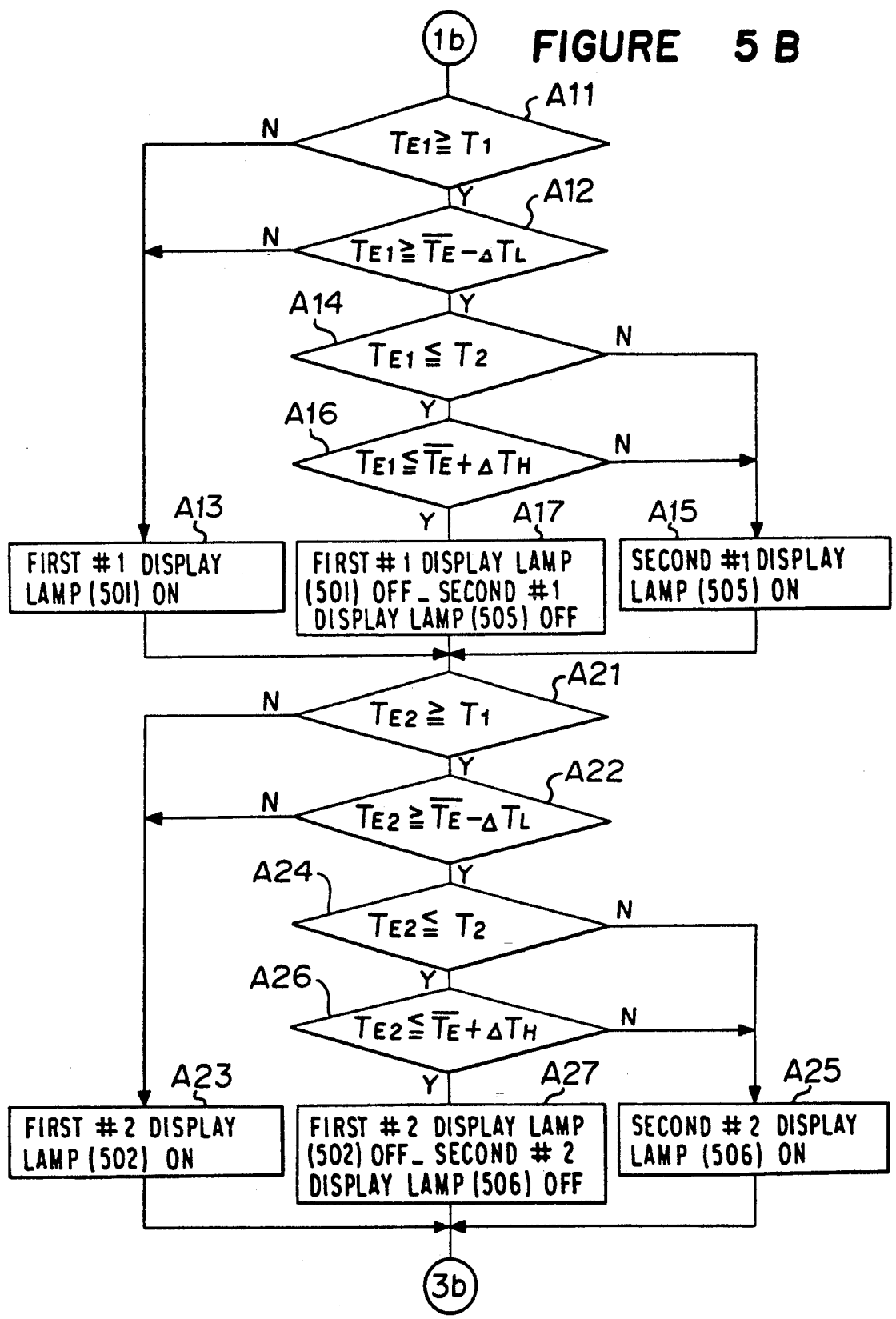

FIGS. 5A to 5C show the second embodiment of the invention. This flow chart is different from that in the first embodiment in that Step 303 is replaced with Step 303A, and the other structure and the operation are the same with those in the first embodiment. In Step 303A, the mean air-fuel ratio value $\overline{T}_E$ is calculated according to the equation $\overline{T}_E = (T_{E1} + T_{E2} + T_{E3} + T_{E4} + m \times T_0)/(4+m)$, where m is an integer more than 1, and $T_0$ is an average air-fuel ratio value in normal time, after a predetermined time elapsed in the zone Z, which is, for instance, obtained by an experiment. Since this mean air-fuel ratio $\overline{T}_E$ is averaged by an addition of $T_0$, $\overline{T}_E$ is near to the value which represents the mean air-fuel ratio in normal time, even when a plurality of cylinders of the engine 1 are in an over-rich state or in an over-lean state. Accordingly, the sensitivity of the criteria of $T_{EG} \geq \overline{T}_E - \Delta T_L$ in Step AG2, and that of the criteria of $T_{EG} \geq \overline{T}_E + \Delta T_H$ are improved compared with the first embodiment. In the second embodiment, the following relationship is to be established.

$$T_1 < T_0 - \Delta T_L < T_0 < T_0 + \Delta T_H < T_2$$

Figure 6:
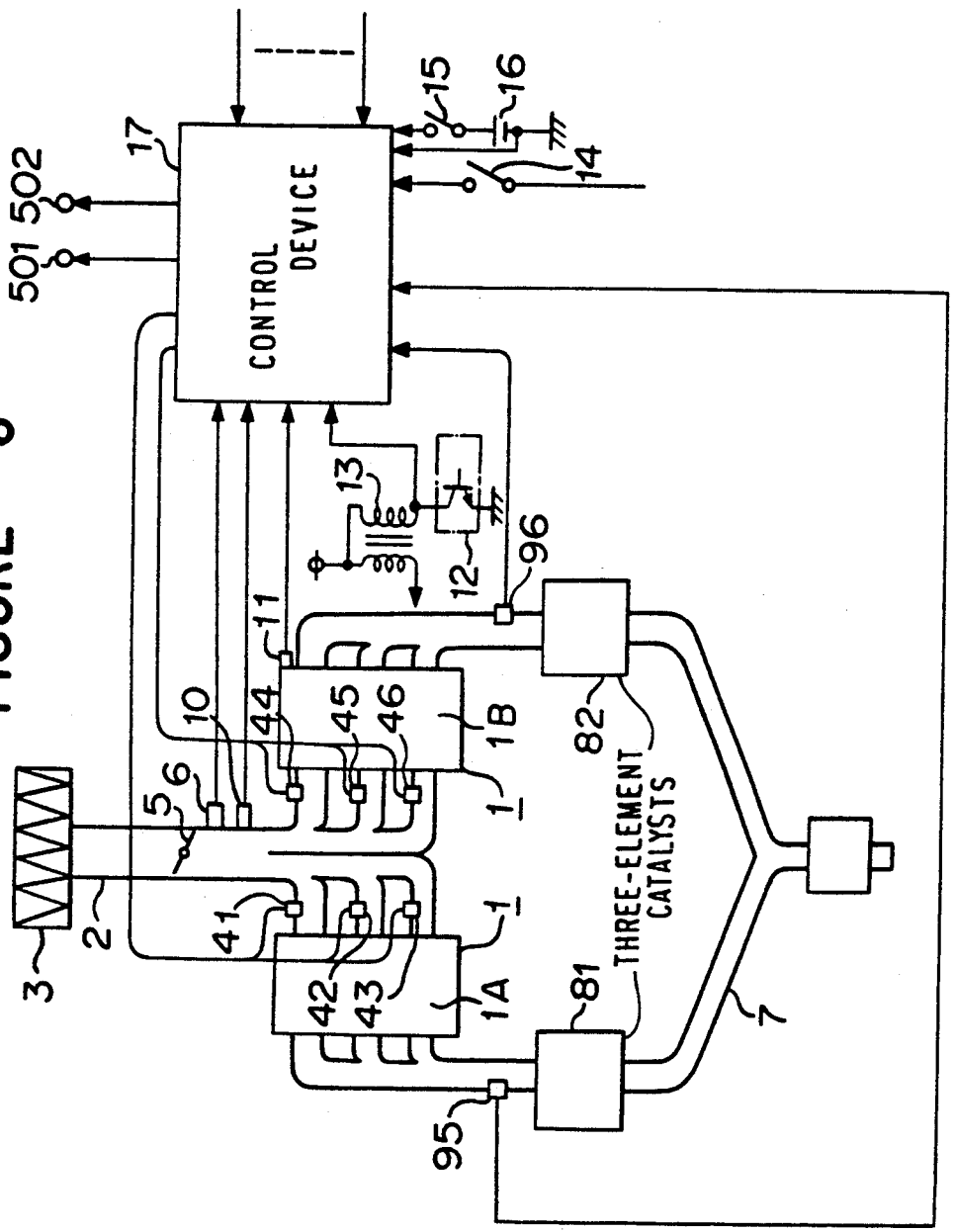
FIG. 6 is a diagram showing the structure of an engine according to a third and a fourth embodiments.

FIG. 6 shows third and fourth embodiments, Wherein the engine is a V-type six cylinder engine, the linear oxygen sensors are installed on the upstream side of the catalyst placed at both banks. In this Figure the same numerals are given to the same or the corresponding parts in FIG. 1, and the explanation is omitted. The engine 1 is a V-type six cylinder engine, composed of the first engine unit 1A for #1 to #3 cylinders, and the second engine unit 1B for #4 to #6 cylinders. For the cylinders of the first engine unit #1 to #3 injectors 41 to 43 are installed respectively, and for cylinders of the second engine unit 1B, #4 to #6 injectors 44 to 46, respectively. In an exhaust passage of the first engine unit 1A, the first three-element-catalyst 81 is installed, and in an exhaust passage of the second engine unit 1B, the second three-element-catalyst 82. In an exhaust pipe of the exhaust manifold 7 on the upstream side of the first three-element-catalyst 81, the first linear oxygen sensor 95 which detects the oxygen concentration in the exhaust gas from the #1 to #3 cylinder group, is installed, and in an exhaust pipe of the exhaust manifold 7 on the upstream side of the second three element catalyst 82, the second linear oxygen sensor 96, is installed, which detects the oxygen concentration of the exhaust gas from the #4 to #6 cylinder group. These first and second linear oxygen sensors 95 and 96 are connected to the control device 17. To the control device 17, the first display lamp 501 which warns and displays an abnormality of the first engine unit 1A and the second display lamp 502 which warns and displays an abnormality of the second engine unit 1B, are connected.

By replacing the notation "#1" to "the first", and "#2" to "the second" in the first and the second embodiments although this replacement is not applicable to the injectors, and by replacing #1 to #4 air-fuel ratio value $T_{E1}$ to $T_{E4}$ in the first and the second embodiment, with the first and the second air-fuel ratio values $T_{E1}$ and $T_{E2}$ obtained from the first and the second linear oxygen sensors 95 and 96 of FIG. 6, and by omitting Steps A31 to A37, and Step A41 to A47 which are related to $T_{E3}$ and $T_{E4}$, the flow charts of the first and the second embodiments are applicable to those in the third and the fourth embodiments. Thereby the abnormality in each cylinder group of the V-6 type six cylinder engine, can be detected.

In the above each embodiment, the linear oxygen sensor which continuously detects the air fuel ratio, is utilized. However, instead of this type of sensor, a $\lambda$ oxygen sensor of which output level varies with the rich or the lean state of the gas, and a HC sensor of which output varies with the unburnt gas, can be utilized with the same effect as in the above embodiments.

In the above embodiments, $T_0$, $T_1$, $T_2$, $\Delta T_L$, and $\Delta T_H$ are not necessary to be fixed values. These may be functions of the revolution number of an engine and a load, or an intake manifold pressure or a suction air quantity or a charging efficiency or a throttle opening etc. For instance these can be obtained from $T_0=f_0(N_{ED}, P_D)$, $T_1=f_1(N_{ED}, P_D)$, $T_2=f_2(N_{ED}, P_D)$, $\Delta T_L=f_3(N_{ED}, P_D)$, $\Delta T_H=f_4(N_{ED}, P_D)$.

Figure 7:
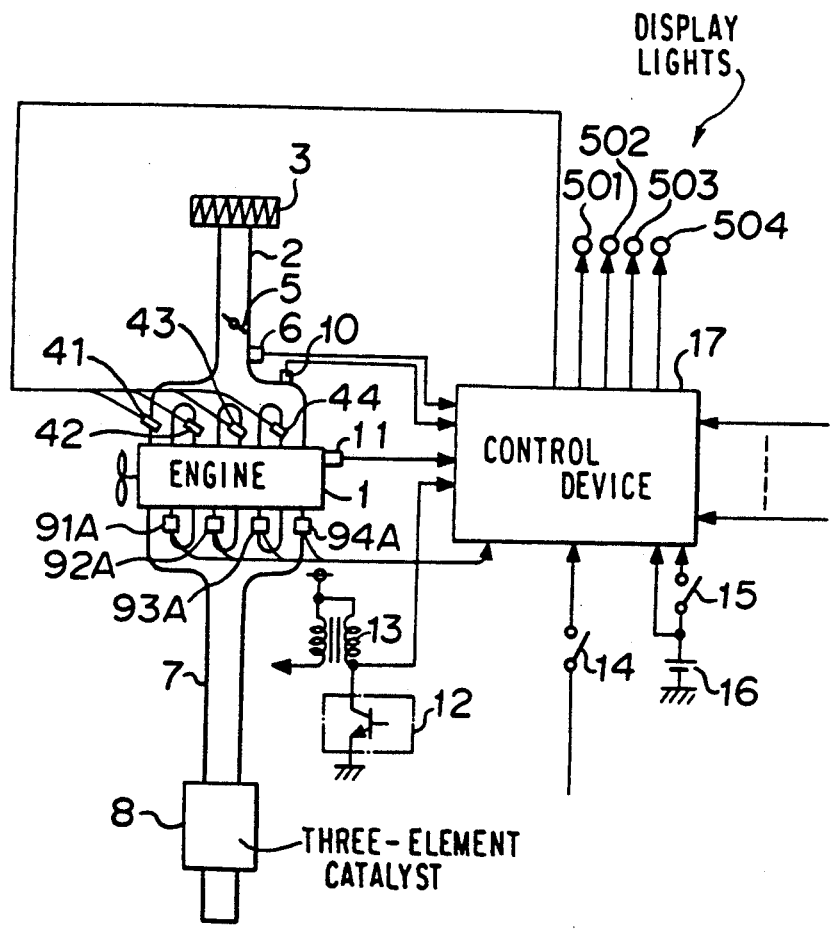
FIG. 7 is a diagram showing the structure of an engine unit according to a fifth embodiment.
Figure 8:
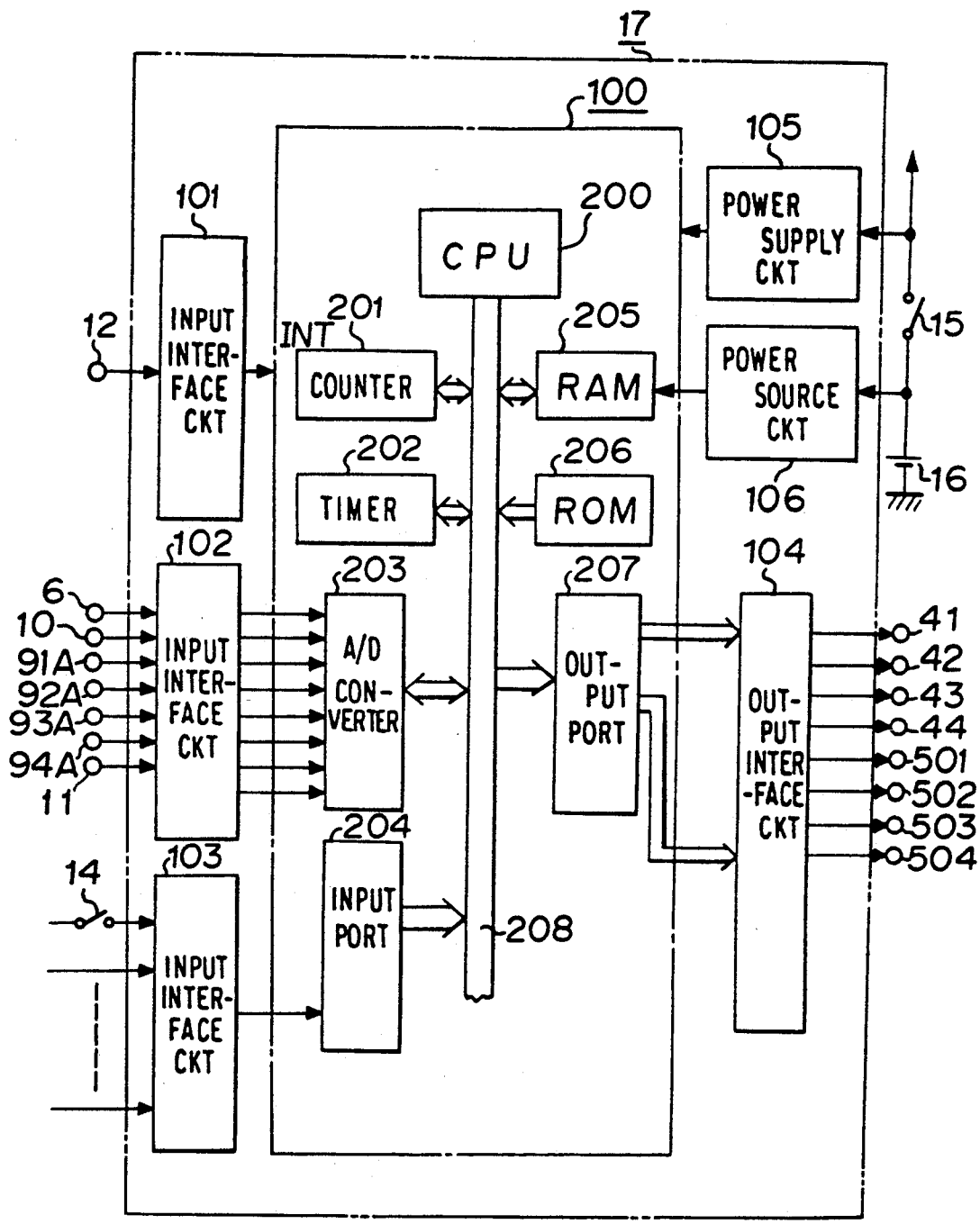
FIG. 8 is a diagram showing the inner structure of the control device according to the fifth embodiment.

FIG. 7 shows a fifth embodiment of the structure of the engine according to the present invention, and FIG. 8 shows the inner structure of the control device in the fifth embodiment according to the invention. In these Figures the same notations 1 to 3, 41 to 44, 5 to 8, 10 to 17, 501 to 504, 100 to 106, and 200 to 208, which signify for the same or the corresponding parts of FIG. 1 and FIG. 2 in the first embodiment, are utilized, and the explanation is omitted. The differences between the fifth embodiment and the first embodiment are, that in the fifth embodiment, instead of linear oxygen sensors, #1 to #4 exhaust pressure sensors 91A to 94A for detecting exhaust pressures for the cylinders of the engine 1, at the exhaust pipes of the exhaust manifold 7, on the upstream side of the three-element-catalysts 8, and that the control program in the ROM 206 is changed to flow charts shown in FIGS. 9A to 9C. #1 to #4 exhaust pressure sensors 91A to 94A are connected to the A/D transformer 203 via the second input interface circuit 102.

The exhaust gas is exhausted to the air through the exhaust manifold 7 and the three-element-catalyst 8. The exhaust pressures for cylinders of the engine 1 is detected by #1 to #4 exhaust pressure sensors 91A to 94A, respectively. Each analogue detect signal is outputted, the size of which corresponds with each exhaust pressure. Analogue detect signals outputted from #1 to #4 exhaust pressure sensors 91A to 94A, are successively converted from analogue signals to digital signals through the second input interface circuit 102 and the A/D converter 203, and successively read in by the CPU as #1 to #4 exhaust pressure values $P_{E1}$ to $P_{E4}$. The other operations Of the engine are the same with in the case of the first embodiment.

Figure 10:
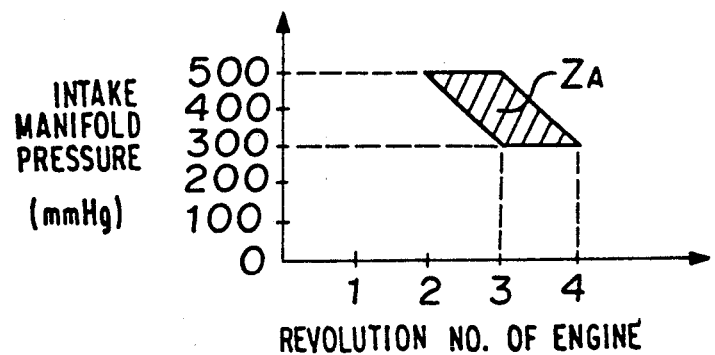
FIG. 10 is an explanatory diagram showing the abnormality criteria zone of an engine according to the fifth embodiment.
Figure 9A:
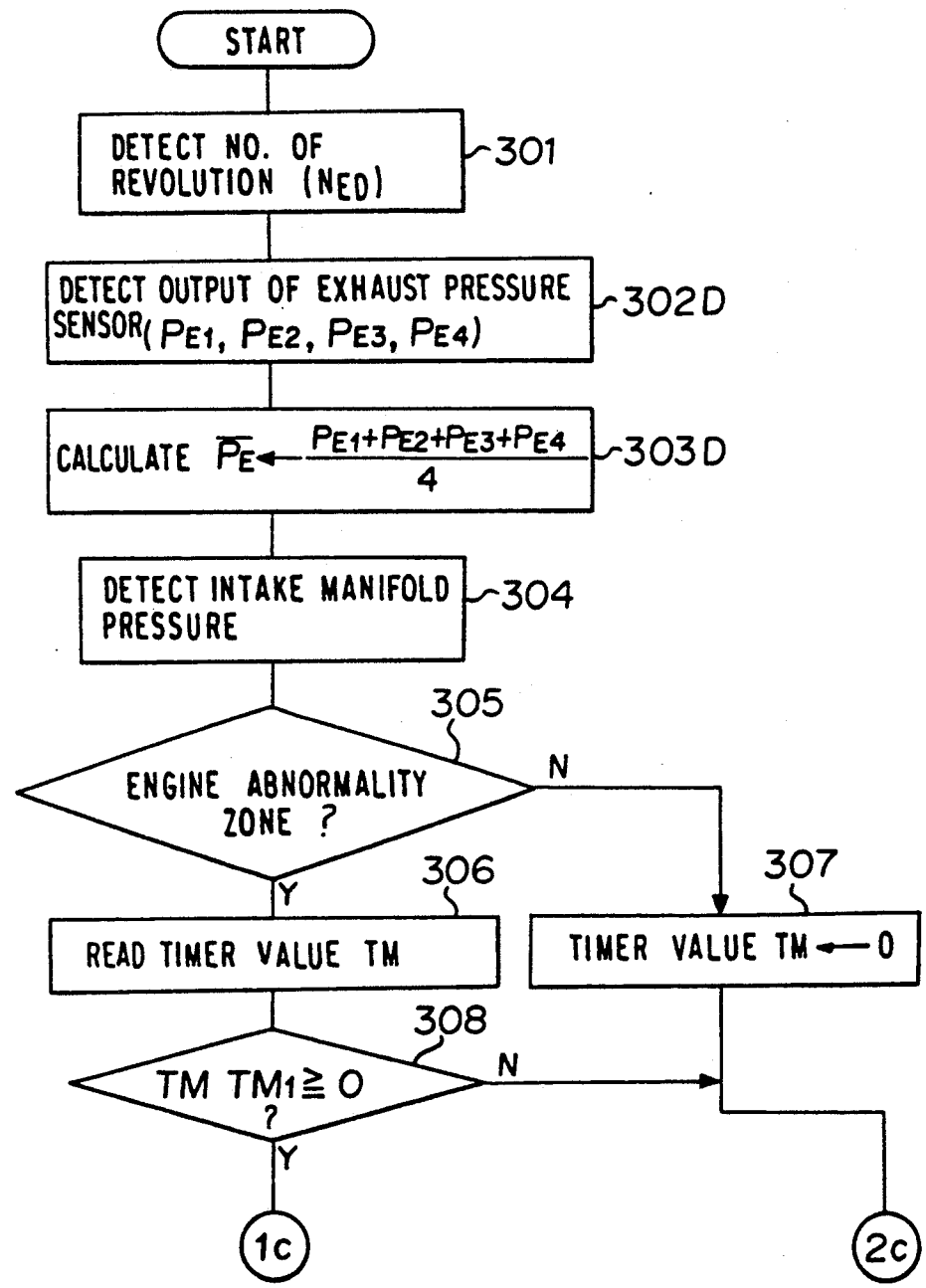
FIGS. 9A, 9B, and 9C are flow charts showing the operation of the control device according to the fifth embodiment.
Figure 9B:
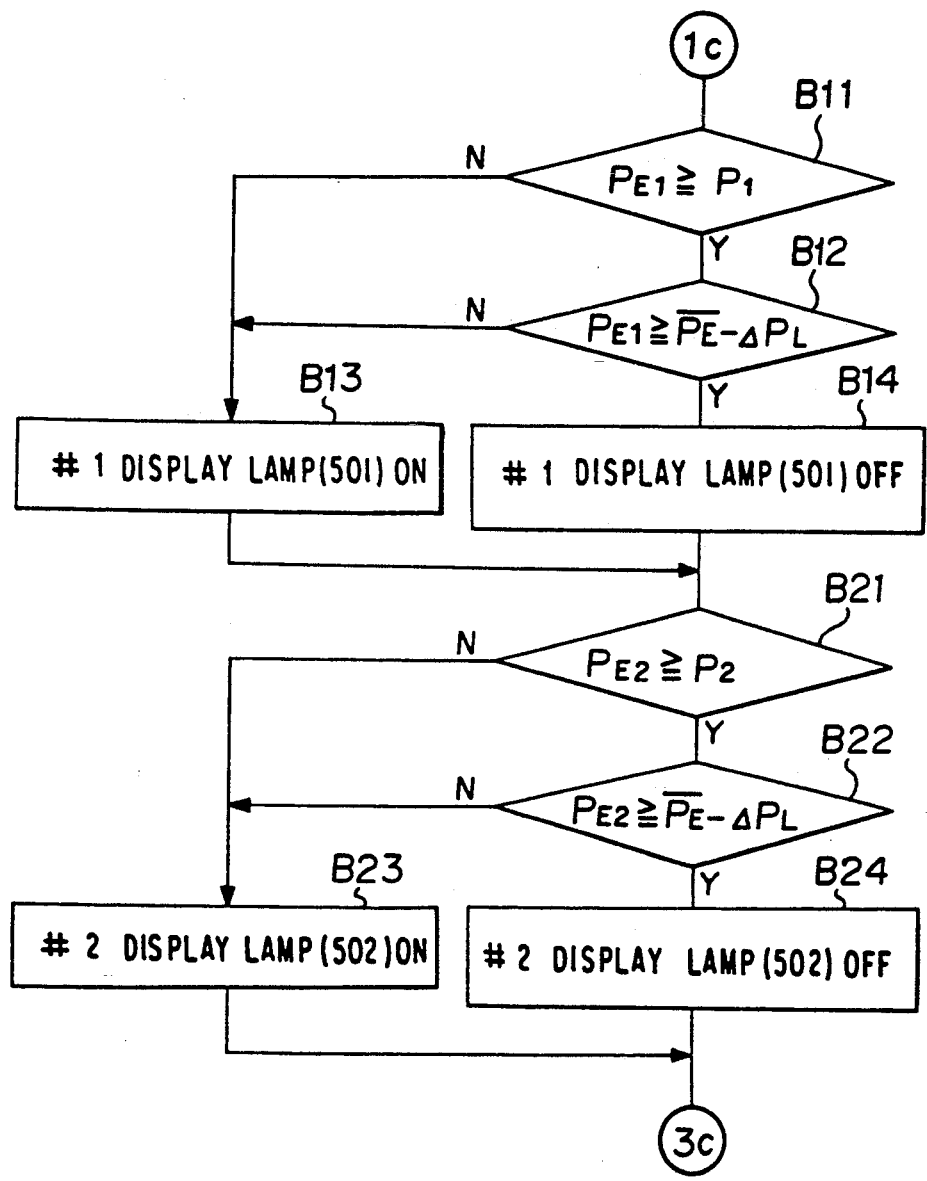
Figure 9:
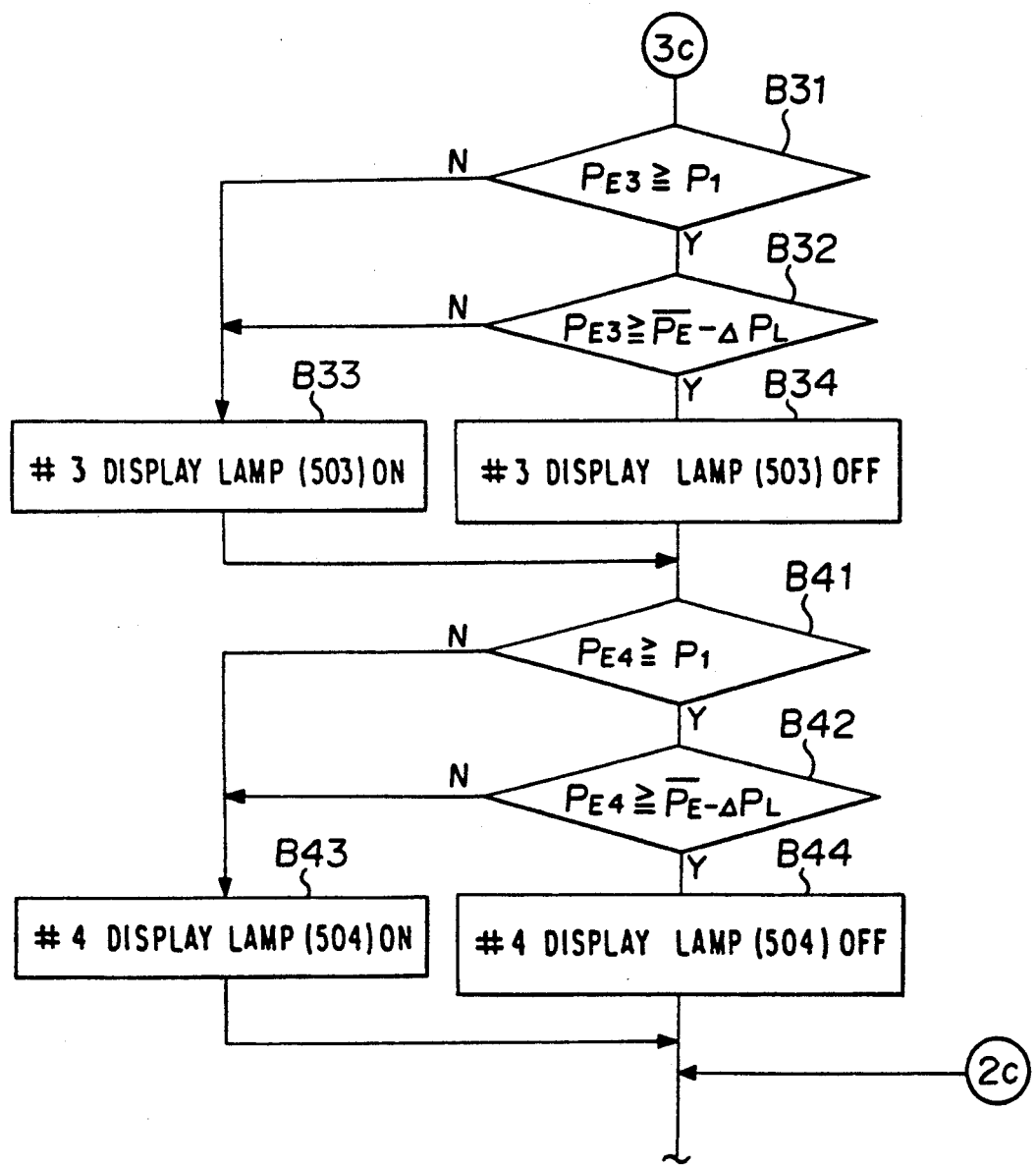

Next, an explanation will be given to the operation of the control device 17 referring mainly to FIGS. 9A to 9C. First of all, in Step 301, the revolution number data $N_{ED}$ which represents the revolution number $N_E$ of the engine 1, is calculated from a change of signal of the igniter 12. In Step 302D, #1 to #4 exhaust pressure values $P_{E1}$ to $P_{E4}$ which represent the exhaust pressure for respective cylinder, obtained from each output Of #1 to #4 exhaust pressure sensors 91A to 94A which detect the exhaust pressure of respective cylinder, is successively read in by the CPU. In Step 303D, $\bar{P}_E=(P_{E1}+P_{E2}+P_{E3}+P_{E4})/4$ is calculated, and the mean exhaust pressure value $\bar{P}_E$ is obtained. In Step 304, the intake manifold pressure value $P_D$ which represents the intake manifold pressure P is read in by CPU. In Step 305, based on the revolution number data $N_{ED}$ and the intake manifold pressure value $P_D$, the control device judges on whether the running condition falls in the engine abnormality criteria zone $Z_A$ shown in the hatched part of FIG. 10. This engine abnormality criteria zone $Z_A$ is a predetermined running domain wherein the exhaust pressure is increased to a certain degree and stabilized, which is converted to a data table and stored in the ROM 206. In Step 305, by utilizing this data table a judgment is made on whether the running condition is in the zone $Z_A$. If the running condition falls in the engine abnormality criteria zone $Z_A$, the operation goes to Step 306 and the timer value of TM is read in. When the running condition falls outside the zone $Z_A$, the operation goes to Step 307 and the timer value TM is reset to 0. In Step 308, a judgment is made on whether the timer value is equal to or above the predetermined value $TM_1$. That is to say, a judgment is made on whether time required for stabilizing exhaust pressure value in the zone $Z_A$ elapsed. When $TM \geq TM_1$ and time which is equal to or more than the predetermined value elapsed, the operation goes to Step B11.

Next, Steps BG1 to BG4 are carried out in the order of G of 1, 2, 3, and 4. The definition of G is the same as in the embodiment 1. In Step BG1, a judgment is made on whether #G exhaust pressure value $P_{EG}$ obtained from the #G exhaust pressure sensor 9GA in Step 302D, is equal to or more than the first predetermined value $P_1$. When $P_{EG}$ is equal to or more than $P_1$, the operation goes to Step PG2. When EG is below $P_1$, the exhaust pressure Of G cylinder is abnormally small, and the operation goes to Step PG3. The first predetermined value $P_1$ is set between a small exhaust pressure value in misfire time and a large exhaust pressure value in normal time. In Step BG2, a judgment is made on whether #G exhaust pressure value $P_{EG}$ is equal to or more than the first averaged criteria value $\overline{P}_E - \Delta P_L$ which is the difference between the mean exhaust pressure value $\overline{P}_E$ obtained in Step 303B and a positive predetermined value $\Delta P_L$. When $\overline{P}_E$ is equal to or more than $\overline{P}_E - \Delta P_L$, the operation goes to Step PG4. If $\overline{P}_E$ is below $\overline{P}_E - \Delta P_L$, the operation goes to Step TG3. In this case, even when for instance one cylinder misfires, the mean exhaust pressure value $\overline{P}_E$ is a value near to the exhaust pressure value in normal time. Accordingly, by subtracting the mean exhaust pressure value $\overline{P}_E$ by $\Delta P_L$, a discrimination is made between the case of normal time and the case of misfire time.

In Step BG3, by the misfire of G cylinder, exhaust pressure is abnormally low and #G display lamp 50G is enlightened. In Step BG4, G cylinder is running normally, and #G display lamp 50G is put off. After a judgment is made as $TM < TM_1$ in Step 307 and in Step 308, and after Step B43, or after B44, the operation goes to a next program.

The misfire in the above description is the case wherein an unburnt mixture is exhausted from cylinder or the case wherein fuel is not supplied to the cylinder.

Figure 11A:
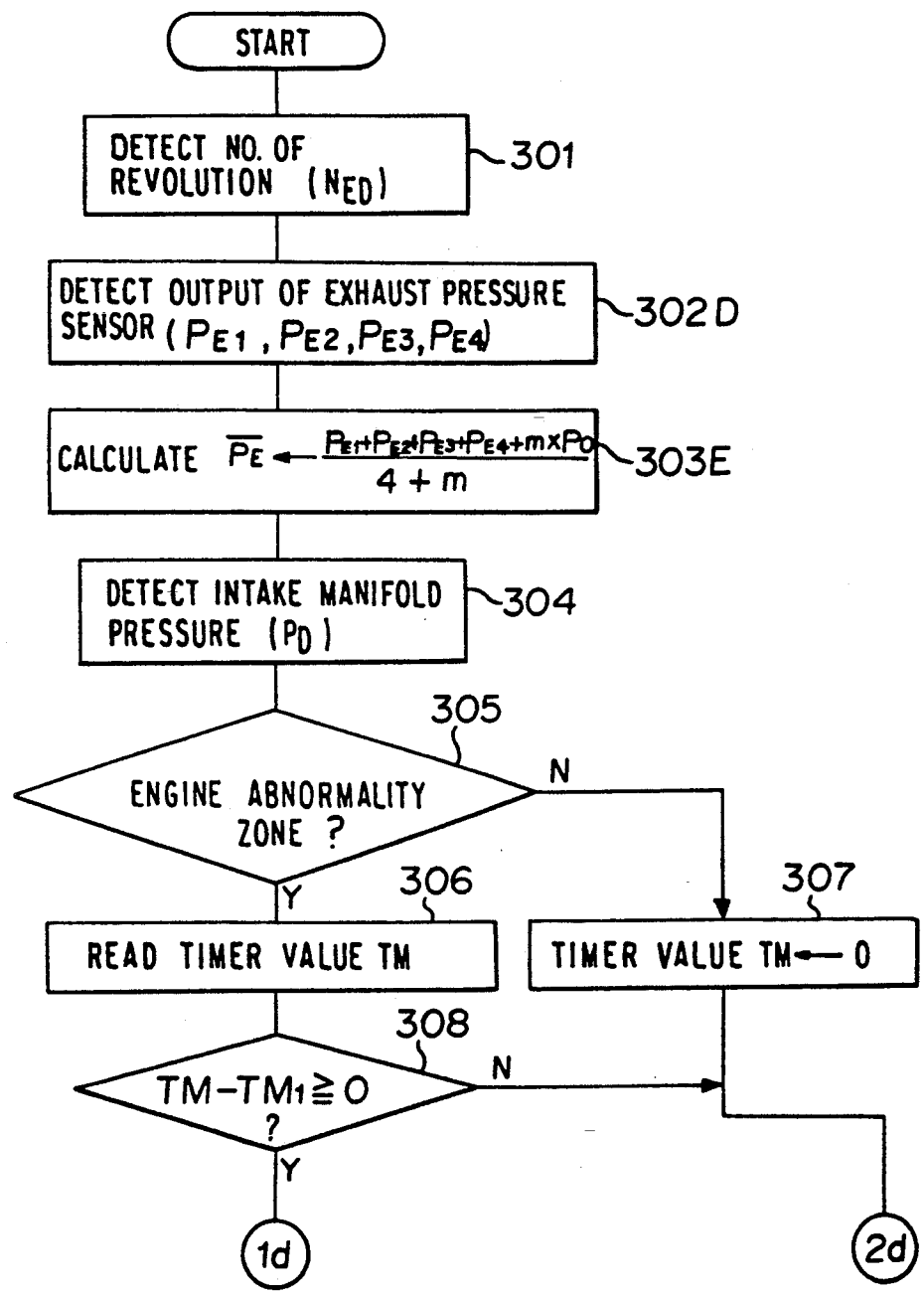
FIGS. 11A, 11B, and 11C are flow charts showing the operation of the control device according to a sixth embodiment.
Figure 11B:
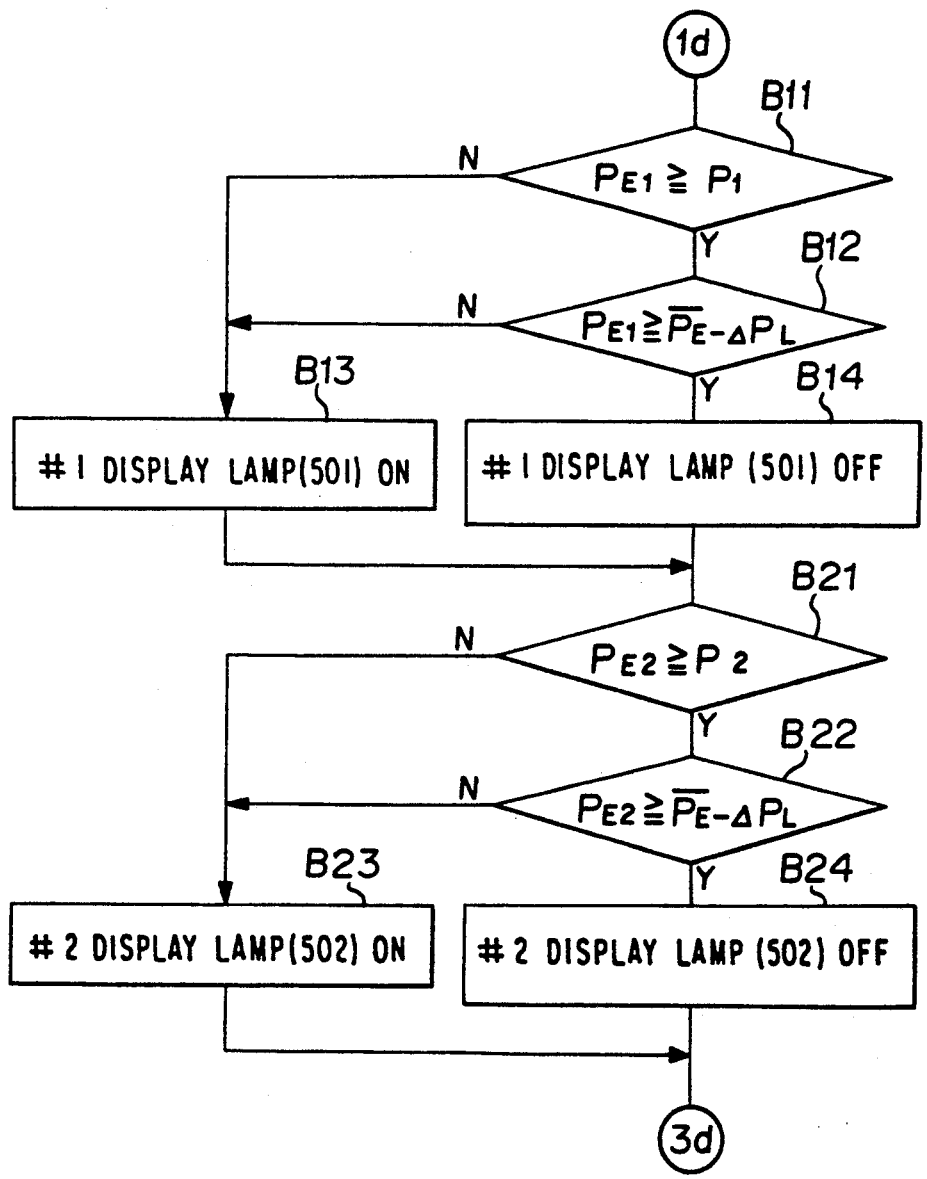
Figure 11C:
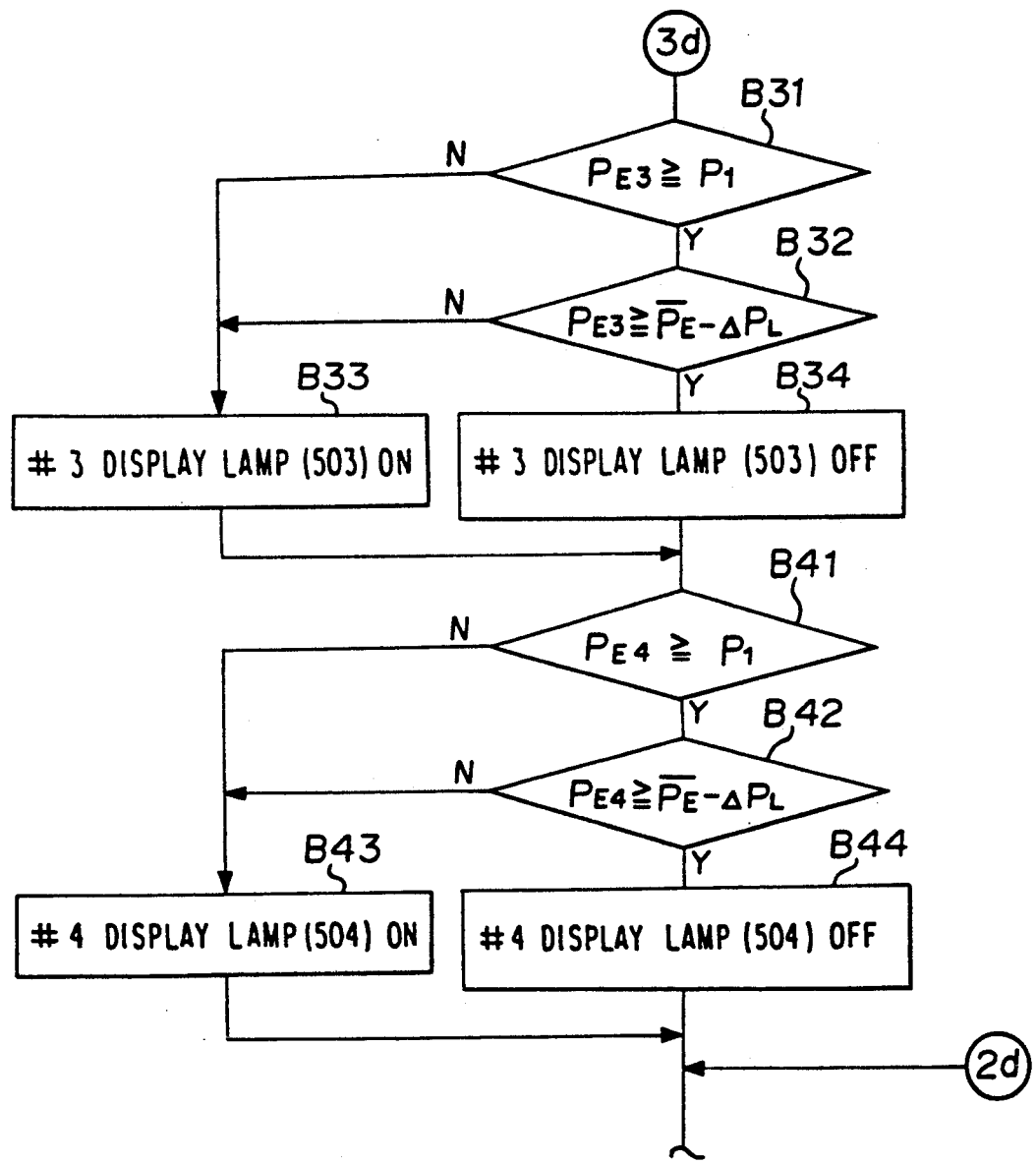

FIGS. 11A to 11C show a sixth embodiment of the invention. The difference between the sixth embodiment and the fifth embodiment is that instead of Step 303D, Step 303E is performed. The other structure and the operation of the sixth embodiment are the same with those in the fifth embodiment. In Step 303E, the mean exhaust pressure value $\overline{P}_E$ is calculated according to the equation of $\overline{P}_E = (P_{E1} + P_{E2} + P_{E3} + P_{E4} + m \times P_0)/(4+m)$, where m is an integer more than 1, and $P_0$ is an average exhaust pressure value in normal time after a predetermined time elapsed in the zone $Z_4$, which can be obtained beforehand for instance by an experiment. This mean exhaust pressure value $\overline{P}_E$ is near to a value which represents the mean exhaust pressure in normal time even when a plurality of cylinders of the engine 1 misfire, since the value is obtained by the calculation of average with the addition of $P_0$. Therefore, the sensitivity of the judgment on whether $P_{EG} \geq \overline{P}_E - \Delta T_L$, in Step BG2, is improved compared with that of the fifth embodiment.

In FIG. 6, when, instead of the first and the second linear oxygen sensors 95 and 96, utilizing the first and second exhaust pressure sensors, whereby the same function is performed as in the fifth and the sixth embodiment, the misfire for each cylinder group can be detected by the detection of the exhaust pressure.

Moreover, in the fifth and the sixth embodiment, $P_0$, $P_1$ and $\Delta P_L$ may not be fixed values. For instance, these may be functions of the engine revolution number and the load, or intake manifold pressure, or a suction air quantity, or a charging efficiency, or a throttle opening etc., as parameters or functions. For instance, these can be obtained from the equations $P_0 = f_{11}(N_{ED}, P_D)$, $P_1 = f_{12}(N_{ED}, P_D)$, $\Delta P_L = f_{13}(N_{ED}, P_D)$.

Furthermore, in the above embodiment, the judgment utilizing the mean air-fuel ratio value $\overline{T}_E$ or the mean exhaust pressure value $\overline{P}_E$ may be omitted. In this case, the linear oxygen sensor or the exhaust pressure sensor may be installed at each cylinder or at each cylinder group as in the embodiments or only one of them may be installed at an exhaust pipe common to all the cylinder.

Moreover, in the above embodiments, the control device performs the control program as an interrupted routine for each predetermined time or for each predetermined step or for each number of revolution, or as a part of a main routine.

As mentioned above, according to the present invention, abnormality of an engine is judged in a predetermined running condition, by the comparison of an air-fuel ratio or an exhaust pressure with their predetermined values, or by determining that the air-fuel ratio or the exhaust pressure is different from the mean air-fuel ratio or the mean exhaust pressure by predetermined values. The abnormality of the malfunction of a fuel system, for instance an injector, or an ignition system may be determined rapidly and accurately, so that the failure judgment can be performed with high reliability.

Moreover, in case of the judgment wherein the air-fuel ratio or the exhaust pressure is different from the mean air-fuel ratio or mean exhaust pressure by a predetermined value, the abnormality can be identified for each cylinder or for each cylinder group. Therefore customers are provided with a good service and by stopping the fuel supply to the abnormal cylinder or abnormal cylinder groups, the drive of the engine can be continued by the residual cylinders.

Obviously, numerous modifications and variations of the present invention are possible in light of the above teachings. It is therefore to be understood that within the scope of the appended claims, the invention may be practiced otherwise than as specifically described herein.

What is claimed is:

1. A failure diagnosis device for an engine comprising:

means, disposed at an exhaust pipe for one of each cylinder and each cylinder group of the engine, for detecting air-fuel ratios for one of each cylinder and each cylinder group of the engine and for outputting corresponding air-fuel ratio signals;

means for detecting a running condition of the engine based on various characteristics of the engine;

means for determining whether the running condition of the engine falls in a predetermined running condition domain which is defined by various characteristics of the engine and in which the air-fuel ratio of the engine is stabilized for a predetermined period of time; and means for determining abnormality in one of a cylinder and a cylinder group of the engine by detecting whether the running condition of the engine falls in said predetermined running condition domain, by determining whether the air-fuel ratio signal of one of a cylinder and a cylinder group of the engine is at least, different from one of an average air-fuel ratio based on the air-fuel ratios of all the cylinders and an average air-fuel ratio based on the air-fuel ratios of all the cylinder groups of the engine, by a predetermined value.

2. A failure diagnosis device for an engine comprising:

means, disposed at an exhaust pipe of the engine, for detecting an exhaust pressure of the engine and for outputting a corresponding exhaust pressure signal;

means for detecting a running condition of the engine based on various predetermined characteristics of the engine;

means for determining whether the detected running condition of the engine falls in a predetermined running condition domain which includes the exhaust pressure of the engine being stabilized for a predetermined period of time; and means for determining an abnormality in the engine by determining whether the running condition of the engine falls in said predetermined running condition domain, by comparing the exhaust pressure signal with a predetermined value.

3. A failure diagnosis device for an engine comprising:

means, disposed at an exhaust pipe for one of each cylinder and each cylinder group of the engine, for detecting exhaust pressures for one of each cylinder and each cylinder group and for outputting corresponding exhaust pressure signals;

means for detecting a running condition of the engine based on various characteristics of the engine;

means for determining whether the running condition of the engine falls in a predetermined condition domain which is defined by various characteristics of the engine and in which the exhaust pressure is stabilized for a predetermined period of time; and means for determining an abnormality in one of a cylinder and a cylinder group of the engine by detecting whether the running condition of the engine falls in said predetermined running condition domain, by determining whether the exhaust pressure signal of one of a cylinder and a cylinder group of the engine, is at least, different from one of an average exhaust pressure based on the exhaust pressures of all the cylinders and an average exhaust pressure based on the exhaust pressures of all the cylinder groups of the engine, by a predetermined value.

* * * * *